United States Patent
Ito

(10) Patent No.: US 6,710,923 B2
(45) Date of Patent: Mar. 23, 2004

(54) DIFFUSING FILM COMPRISING TRANSPARENT RESIN AND SCATTERERS

(75) Inventor: Yoji Ito, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 10/326,969

(22) Filed: Dec. 24, 2002

(65) Prior Publication Data

US 2003/0147140 A1 Aug. 7, 2003

(30) Foreign Application Priority Data

Dec. 27, 2001 (JP) ....................... 2001-397748

(51) Int. Cl.$^7$ ............................................. G02B 13/20
(52) U.S. Cl. ..................... 359/599; 359/707; 359/708; 359/717
(58) Field of Search ................. 359/599, 707, 359/708, 717; 427/494, 495; 349/64, 112, 68, 74, 76, 118; 362/31

(56) References Cited

U.S. PATENT DOCUMENTS 5,387,463 A   2/1995   Nakamura et al.
5,568,290 A   10/1996  Nakamura
5,583,679 A   12/1996  Ito et al.
6,111,699 A   8/2000   Iwata et al.
6,164,785 A   12/2000  Maekawa
6,217,176 B1  4/2001   Maekawa
6,343,865 B1  2/2002   Suzuki
6,483,561 B2  11/2002  Maruyama et al.
6,504,589 B1 * 1/2003   Kashima et al. .............. 349/96
2002/0150722 A1  10/2002  Suzuki

FOREIGN PATENT DOCUMENTS

EP   0 911 656 A2    4/1999
JP   11-326608 A    11/1999
JP   2000-121809 A   4/2000
JP   2001-033783 A   2/2001
JP   2001-056461 A   2/2001

* cited by examiner

Primary Examiner—Mohammad Sikder
(74) Attorney, Agent, or Firm—Burns, Doane, Swecker & Mathis, LLP

(57) ABSTRACT

A diffusing film comprises a transparent resin in which scatterers are dispersed. The difference between the refractive index of the transparent resin and that of the scatterers is in the range of 0.04 to 1.5. The scatterers are flat particles having sizes of 0.1 to 50 μm.

24 Claims, 1 Drawing Sheet

DIFFUSING FILM COMPRISING TRANSPARENT RESIN AND SCATTERERS

FIELD OF THE INVENTION

The present invention relates to a diffusing film, which can be attached on z screen side in a liquid crystal display. In detail, the invention relates to a diffusing film and a polarizing plate that improve quality of an image given by a liquid crystal display.

BACKGROUND OF THE INVENTION

A liquid crystal display generally comprises a polarizing plate and a liquid crystal cell. For ensuring the quality of displayed images, the viewing angle must be enlarged and the display surface (screen) must be prevented from reflecting light coming from outside.

The most widely used display is a TFT liquid crystal display of TN mode, in which an optical compensatory sheet is provided between the polarizing plate and the liquid crystal cell. As described in Japanese Patent Provisional Publication Nos. 7(1995)-191217, 8(1996)-50206 and European Patent No. 0911656A2, the TFT liquid crystal display of TN mode gives an image of high quality within a wide viewing angle range. However, gradation of an image displayed by the TFT liquid crystal display-is often inverted when the screen is seen downward.

To solve the problem, various proposals have been given. For example, it has been proposed that a diffusing means (Japanese Patent No. 2,822,983), an optical axis exchanger (Japanese Patent Publication No. 2001-33783) or an optical means for diffusing emitted light (Japanese Patent Publication No. 2001-56461) be provided on the observer side surface to improve the image quality remarkably. However, in these methods, it is necessary to use a diffusing means having highly controlled lens or diffraction grating structure, which costs a lot and is very difficult to mass-produce.

Japanese Patent Provisional Publication Nos. 6(1994)-18706 and 10(1998)-20103 disclose a diffusing film in which a transparent substrate is coated with a resin containing filler (e.g., silicone dioxide (silica)). That diffusing film can be mass-produced at low cost.

Japanese Patent Provisional Publication Nos. 11(1999)-160505, 11(1999)-305010, 11(1999)-326608, 2000–121809, 2000–180611 and 2000–338310 disclose other diffusing films, but they cannot fully improve the image quality.

Recently, liquid crystal displays have been often used as monitors having enough fine pixels to display minute images. However, the monitors equipped with the diffusing films often display blurred images.

For preventing the display surface from reflecting light coming from outside, an anti-reflection film is generally provided. The anti-reflection film is placed on the top surface of the display, and causes optical interference to reduce reflectance so that the displaying screen may be prevented from reflecting surrounding scenes and thereby so that the contrast of displayed image may not impaired. However, the anti-reflection film by no means solves the problem of viewing angle (inversion of gradation), and therefore it has been wanted to provide an anti-reflection film which prevents well the display surface from reflecting light coming from outside and at the same time which solves the problem of viewing angle.

SUMMERY OF THE INVENTION

It is an object of the present invention to provide a diffusing film and an anti-reflection film for enlarging the viewing angle of liquid crystal display, particularly for preventing the display surface from reflecting surrounding scenes and for preventing inversion of gradation when the display is seen downward. The aimed films enable a liquid crystal display to give a clear image even if the display is used as the minutely displaying monitor.

It is another object of the invention to provide a polarizing plate that enlarges the viewing angle (particularly, viewing angle when the display is seen downward) without thickening the liquid crystal display. The aimed polarizing plate has improved durability, and prevents the image quality from impairments (such as deterioration of contrast, inversion of gradation or inversion of black to white or white to black, and unfavorable fluctuation of hue), which are often observed according to the viewing angle. The invention also aims to provide a liquid crystal display equipped with that polarizing plate.

The objects of the invention are achieved by the diffusing films (1) to (12), the processes for preparation of a diffusing film (13) to (15), the polarizing plates (16) to (18) and the liquid crystal displays (19) and (20), described below.

(1) A diffusing film comprising a transparent resin in which scatterers are dispersed, wherein the difference between the refractive index of the transparent resin and that of the scatterers is in the range of 0.04 to 1.5, and wherein scatterers are flat particles having particle sizes in the range of 0.1 to 50 μm.

(2) The diffusing film of (1), wherein the scatterers are tabular particles.

(3) The diffusing film of (2), wherein the ratio of the average size of scatterers in a section parallel to the film plane to that in a section perpendicular to the film plane is 2 or more.

(4) The diffusing film of (1), wherein the scatterers are columnar or rod-like particles.

(5) The diffusing film of (4), wherein the ratio of the average size of scatterers in the section parallel to the film plane to that in the section perpendicular to the film plane is 0.5 or less.

(6) The diffusing film of (1), wherein at least one surface of the diffusing film has a surface roughness of 0.05 to 0.18 μm.

(7) The diffusing film of (1), wherein the transparent resin further contains a matting agent in the form of fine particles, and the difference between the refractive index of the transparent resin and that of the matting agent is less than 0.04.

(8) The diffusing film of (1), wherein the transparent resin furthermore contains superfine particles whose particle sizes are less than 0.1 μm.

(9) The diffusing film of (1), wherein a scattering layer comprising the transparent resin and the scatterers dispersed therein is provided on a transparent substrate.

(10) The diffusing film of (9), wherein the scattering layer has a thickness of 2.0 to 6.0 μm.

(11) The diffusing film of (9), wherein a low-refractive index layer is further provided on the scattering layer.

(12) The diffusing film of (11), wherein an incident ray coming into the low-refractive index layer at the incident angle of 5° is reflected in an average mirror reflectance of 2.5% or less in the wavelength region of 450 to 650 nm.

(13) A process for preparation of a diffusing film comprising the steps of: dissolving or dispersing a transparent resin and scatterers whose refractive index differs from that of the transparent resin by 0.04 to 1.5, in a mixture of a solvent having a function of dissolving a transparent substrate and another solvent having a function of not dissolving the substrate, to prepare a coating solution; applying the solution onto the transparent substrate; and drying the solution to form a scattering layer containing flat scatters which have particle size of 0.1 to 50 μm.

(14) The process of (13), wherein the scattering layer has a thickness of 2.0 to 6.0 μm, and the transparent resin soaks into a depth of 0.01 to 1.0 μm in the substrate.

(15) The process of (13), wherein the substrate is made of cellulose acetate, and the solvent dissolving the substrate contains a ketone.

(16) A polarizing plate comprising a pair of protective films and a polarizing membrane provided between them, wherein one of the protective films is a diffusing film comprising a transparent resin in which scatterers are dispersed, wherein the difference between the refractive index of the transparent resin and that of the scatterers is in the range of 0.04 to 1.5, and wherein scatterers are flat particles having particle sizes in the range of 0.1 to 50 μm.

(17) The polarizing plate of (16), wherein an optically anisotrbpic layer comprising a liquid crystal compound is provided on the other protective film.

(18) The polarizing plate of (17), wherein the liquid crystal compound is a discotic compound.

(19) A liquid crystal display of transmission type comprising a pair of polarizing plates and a liquid crystal cell provided between them, wherein the polarizing plate comprises a pair of protective films and a polarizing membrane provided between them, and the protective film on the screen side is a diffusing film comprising a transparent resin in which scatterers are dispersed, wherein the difference between the refractive index of the transparent resin and that of the scatterers is in the range of 0.04 to 1.5, and wherein scatterers are flat particles having particle sizes in the range of 0.1 to 50 μm.

(20) A liquid crystal display of reflection type comprising a reflection board, a liquid crystal cell and a polarizing plate in this order, wherein the polarizing plate comprises a pair of protective films and a polarizing membrane provided between them, and the protective film on the screen side is a diffusing film comprising a transparent resin in which scatterers are dispersed, wherein the difference between the refractive index of the transparent resin and that of the scatterers is in the range of 0.04 to 1.5, and wherein scatterers are flat particles having particle sizes in the range of 0.1 to 50 μm.

The applicant has found that the scattering profile (intensity according to viewing angle) of light having passed through the scattering layer within a particular angle to the normal and the haze value thereof (particularly, the internal scattering haze value thereof, which greatly contributes to diffusion of the transmitted light) relate to improvement of the viewing angle character and to blur of the displayed image. In detail, according to the applicant's study, the intensity of light scattered within the angle of 40° to the normal enlarges the viewing angle, and that at an angle of 50° or more makes the blur worse.

The applicant has further studied, and finally succeeded in controlling the surface roughness by properly selecting shapes (sectional sizes seen at the observing angle) of the scatterers. The surface roughness is controlled so that the desired scattering profile can be obtained. Further, a low-refractive index layer is formed on a surface having the properly controlled roughness to prepare an anti-reflection film, which can prevent the displaying screen from reflecting surrounding scenes and also which can improve the viewing angle character without blurring the displayed image (consequently, the transmitted image can be kept very clear).

Light emitted from the backlight is scattered by the diffusing film provided on the polarizing plate of the observer side. The more the light is scattered within the angle of 40° to the normal, the more the viewing angle character is improved. However, if too much amount of light is scattered at the angle of 50° or more to the normal, the blur becomes worse. Further, if the light scattered at the angle of 90° or more to the normal (light scattered backward) increases, the brightness of image seen frontally is lowered or the clearness of image is impaired.

Although conventional spherical scatterers can improve the viewing angle character, they at the same time make the blur worse or impair the brightness of image seen frontally. In contrast, according to the invention, the viewing angle character can be improved without impairing the quality of displayed image (without lowering the brightness and without causing the blur).

DETAILED DESCRIPTION OF THE INVENTION

[Basic Structure of Diffusing Film]

Figure 1:
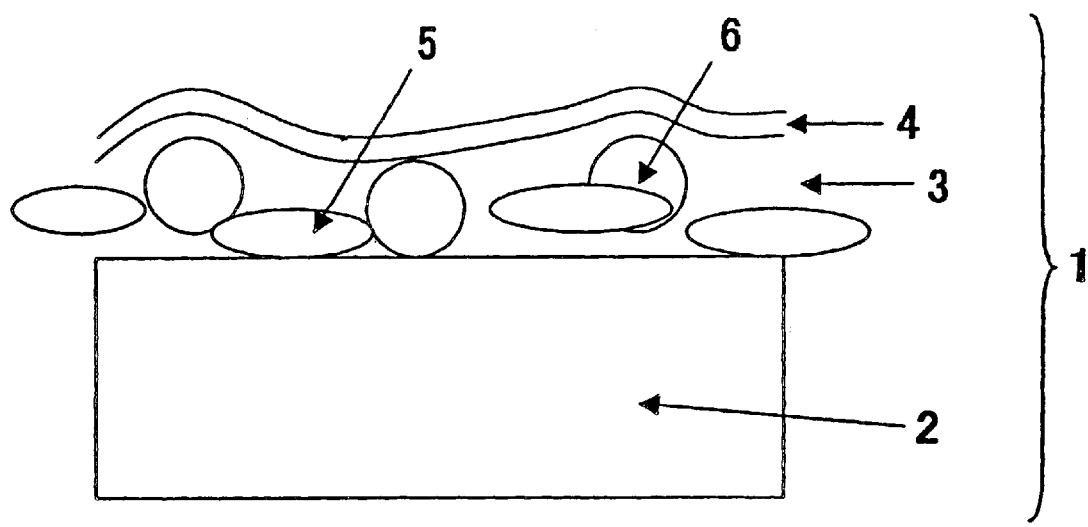
FIG. 1 is a sectional view schematically illustrating an example of the anti-reflection film.

The diffusing film of the invention has a haze measured along the normal preferably in the range of 1 to 40%, more preferably in the range of 5 to 30%, most preferably in the range of 7 to 20%.

The haze measured in the direction inclined from the normal is preferably larger than that measured along the normal. For example, the haze measured in the direction inclined at the angle of 30° to the normal is preferably in the range of 20 to 70%, more preferably in the range of 30 to 60%.

In order to control the haze, the content of the scatterers may be increased or the difference between the refractive index of the transparent resin (binder) and that of the scatterers may be properly controlled.

In consideration of recognizability, it is also necessary to make the film surface rough enough to give an adequate surface haze. The frontally measured haze (total of the internal scattering haze and the surface haze when seen frontally) is preferably 10% or more.

The surface roughness also contributes to the blur of image. The surface roughness Ra is preferably 0.18 μm or less, more preferably 0.16 μm or less, most preferably 0.14 μm or less. In order to obtain the proper surface haze described above, the surface roughness Ra is preferably 0.05 μm or more.

The content of binder in the scattering layer is controlled so that the layer may have a desired surface roughness. If the content of binder is too large, the particles hardly project on the surface of the layer to lower the surface roughness. The content of binder can be increased by increasing the amount of binder in a coating solution for forming the scattering layer, by controlling the solvent composition in the coating solution, or by controlling conditions for drying the applied solution in forming the layer. In order to obtain a small surface roughness, the applied solution is preferably dried so slowly that the solution can fully level out to form a smooth surface. Further, to produce a smooth surface, it is also preferred that the solvent composition hardly soak into (hardly dissolve) the transparent substrate. However, in consideration of adhesion between the scattering layer and the transparent substrate, it is necessary for the mixture of solvent composition to contain a solvent that soaks into (dissolves) the substrate at a certain degree.

The coating solution is treated at a temperature of 20 to 40° C. The solvent composition preferably comprises a solvent that dissolves the substrate (A) and another solvent that does not dissolve the substrate (B). As the former solvent (A), methyl ethyl ketone (which dries relatively fast) is preferred. As the latter solvent (B), methyl isobutyl ketone (which is also a kind of ketones) is preferred. The total weight ratio of (A/B) is preferably in the range of 10/90 to 30/70, more preferably in the range of 15/85 to 25/75.

A preferred embodiment of the anti-reflection film comprises a transparent support made of triacetyl cellulose, at least one scattering layer provided thereon, and at least one low refractive index layer further provided thereon.

FIG. 1 is a sectional view schematically illustrating an example of the anti-reflection film.

The anti-reflection film (1) comprises a transparent support made of triacetyl cellulose (2), a scattering layer (3), and a low-refractive index layer (4), piled up in this order. In the scattering layer (3), scatterers (5) and matting particles (6) for controlling the surface roughness are dispersed. The scattering layer (3) may consist of two or more sub-layers.

The transparent resin (binder) in the scattering layer has a refractive index preferably in the range of 1.50 to 2.00. The low refractive index layer has a refractive index preferably in the range of 1.35 to 1.45. The refractive index of triacetyl cellulose (which is a preferred material for the transparent support) is 1.48.

Since the scattering layer (binder) has the above high refractive index, excellent anti-reflection effect can be obtained even if the low refractive index layer has a refractive index of 1.35 to 1.45. Accordingly, if the refractive index of the scattering layer is too small, the anti-reflection effect is impaired. On the other hand, if it is too large, the reflected light is undesirably colored.

[Scattering Layer]

The scattering layer preferably comprises scatterers, matting particles, and a transparent resin. As described above, the haze value of an image frontally or obliquely seen is controlled with the scattering layer.

The scatterers used in the invention have the following characters of (a) to (c):

(a) being flat, (b) having a refractive index different from the refractive index of the transparent resin by 0.04 to 1.5, and (c) having particle sizes in the range of 0.1 to 50 $\mu$m.

In the above, the term "particle size" means the average of lengths parallel to the normal (Z) and parallel to the film surface (X, Y).

Further, the scatterers preferably have the following characters of (d) and (e):

(d) having an average size of 0.1 to 50.0 $\mu$m in the section parallel to the film plane, and (e) having an average size of 0.01 to 10.0 $\mu$m in the section perpendicular to the film plane.

The scattering intensity preferably varies continuously when the viewing angle is continuously changed to inline from the normal of the film, and therefore the flat scatterers are preferably columnar, rod-like or ellipsoidal (particularly, discotic) particles.

In the case where the scatterers are ellipsoidal particles, the long axes of the particles are preferably almost perpendicular to the normal. However, to enlarge the viewing angle in a particular direction, the particles may be aligned at a certain angle to the normal. In that case, the average aspect ratio is preferably 3 or more, more preferably 5 or more, so that the film may work effectively in a liquid crystal display (so that the viewing angle may be effectively enlarged without impairing the contrast of image seen frontally and without blurring the image). Further, in some cases, the scatterers having different aspect ratios are mixed to use so that the viewing angle may be effectively enlarged.

The term "aspect ratio" here means the ratio of the scatterer size in the section parallel to the film surface per that perpendicular to the film surface (in the section including the normal of the film).

In the case where the scatterers are columnar or rod-like particles, the long axes of the particles are preferably almost parallel to the normal. The average aspect ratio is preferably 0.5 or less, more preferably 0.3 or less, most preferably 0.2 or less.

The difference of the refractive index of the scatterers and that of the transparent resin (binder) structuring the whole scattering layer is in the range of 0.04 to 1.5, preferably in the range of 0.04 to 1.0, more preferably in the range of 0.04 to 0.5, most preferably in the range of 0.04 to 0.2. If the difference is less than 0.04, it is too small to scatter light. If it is more than 1.5, the whole film whitens.

The scatterers have particle sizes in the range of 0.1 to 50 $\mu$m.

The matting particles are preferably transparent. Since the matting particles are used to control the surface roughness of the scattering layer, the difference between the refractive index of the matting particles and that of the binder is preferably small. The difference is preferably smaller than 0.04, more preferably smaller than 0.03, most preferably 0.02 or less.

The sizes of the matting particles are preferably in the range of 2.5 to 5.0 $\mu$m. They are properly controlled to realize the desired surface scattering.

In order to improve the quality of displayed image (to improve the viewing angle when the screen is seen downward), it is necessary to scatter incident light obliquely coming into the scattering layer. The more the light is scattered, the more the viewing angel character is improved. However, to ensure the brightness of image seen frontally, it is preferred to scatter incident light vertically coming into the scattering layer as little as possible.

Further, in order to obtain the required image quality, it is also necessary to prevent the screen from reflecting surrounding scenes. The smaller the surface haze value is, the less blurry and hence the clearer image the display gives. However, if the haze value is too small, the displaying screen is liable to reflect surrounding scenes and sparkles (scintillations) are often observed on the screen. In contrast, if it is too large, the displayed image is whitened (whitening; decline of black tone). Accordingly, the surface haze value (hs) satisfies the condition of preferably 0.5<hs<30, more preferably $3 \leq hs \leq 20$, most preferably $7 \leq hs \leq 15$.

For controlling the surface haze value, fine particles are incorporated in the layer to make the surface adequately rough. The haze value can be determined by means of a measuring apparatus (HR-100, Murakami Shikisai Gijutsukenkyujo Co., Ltd,) according to JIS-K-7105.

If the mean particle size of the fine particles is 2.5 $\mu$m or less, the surface roughness is so little that incident light is not enough scattered to prevent the surface from reflecting surrounding scenes. If it is 5.0 $\mu$m or more, although the surface is rough enough to be prevented from reflecting surrounding scenes, the surface is remarkably whitened to impair the image quality. Accordingly, the mean particle size is preferably in the range of 2.2 to 4.7 μm, more preferably in the range of 2.4 to 4.5 μm. The surface roughness (Ra) is preferably 1.2 μm or less, more preferably 0.8 μm or less, most preferably 0.5 μm or less.

The scatterers and the matting particles may be monodispersed organic or inorganic particles. The sizes of the particles are preferably uniform. If so, the scattering characters of the particles are almost the same, and hence the haze is easily controlled. The material for the scatterers is not particularly restricted as long as its refractive index satisfies the above condition with that of the binder.

For forming the scattering layer, organic or inorganic particles are preferably dispersed as the flat scatterers in the transparent resin, and the dispersion is applied on a transparent substrate. The scatterers can be prepared from various materials (e.g., proteins, silicon oxide, metal oxides, polymers). If the material is a polymer, the scatterers can be prepared by emulsion polymerization of monomer (for example, ester of polyhydric alcohols and (meth)acrylic acid) in the stage of producing the diffusing film. The scatterers are preferably fine particles of gelatin (refractive index: 1.44) or dipentaerythritol hexaacrylate polymer (refractive index: 1.51).

Further, commercially available fine particles may be used as the scatterers. Examples of the commercially available fine particles include mica particles (Micromica, Coop Chemicals Co., Ltd.), silk protein particles (Idemistu silk powder, Idemitsu Petrochemical Industries, Ltd.), and alumina particles (Ceraf, Yoshida Kogyo K.K.). In addition, as the columnar scatterers, fine columnar stacks of barium ferrite can be used.

The scattering layer containing the flat scatterers can be also formed by the steps of: dispersing and emulsifying the scatterers in the binder to prepare a coating emulsion, applying the emulsion onto the transparent substrate, and drying to let the layer shrink in the thickness direction (emulsification method). Otherwise, a coating liquid containing the binder and the scatterers having an aspect ratio of 2 or more (discotic scatterers) dispersed therein may be applied on the substrate to form the scattering layer (dispersing method).

As the matting particles, plastic beads are preferred. The plastic beads are preferably made of material having high transparency, and the difference between the refractive index of the material and that of the transparent resin is preferably in the aforementioned range.

Examples of the material for the beads include polymethylmethacrylate (refractive index: 1.51), acrylstyrene copolymer (refractive index: 1.55), melamine (refractive index: 1.57), polycarbonate (refractive index: 1.57), polystyrene (refractive index: 1.60), crosslinked polystyrene (refractive index: 1.61), polyvinyl chloride (refractive index: 1.60), and benzoguanamine-melamine formaldehyde (refractive index: 1.68).

The size of the plastic beads is preferably in the range of 0.5 to 5 μm, as described above. The amount of the beads is preferably in the range of 5 to 30 weight parts per 100 weight parts of the transparent resin.

As the transparent resin, a composition comprising a commercially available polymer or a resin hardened with ultraviolet ray or electron beam is used. An ionization radiation (i.e., ultraviolet ray or electron beam)-setting resin, a mixture of ionization radiation-setting-resin and thermoplastic resin in a solvent, or a thermosetting resin can be used.

In the transparent resin, inorganic filler such as silica or zirconia may be added for preventing the transparent particles (scatterers and matting agent) from settling down or for controlling the refractive index. The more the inorganic filler is added, the more the particles are prevented from settling down. However, if it is too much added, the transparency of the film is impaired. Accordingly, the inorganic filler consisting of grains having sizes of 0.5 μm or less are preferably added in an amount of less than 0.1 wt. % based on the amount of the transparent resin. That amount of the filler hardly lowers the transparency.

The thickness of the scattering layer is normally in the range of 2 to 6 μm, preferably in the range of 3 to 5 μm.

The transparent resin has a refractive index preferably in the range of 1.50 to 2.00, more preferably in the range of 1.53 to 1.95, further preferably in the range of 1.57 to 1.90, most preferably in the range of 1.64 to 1.80. The refractive index of the transparent resin is determined by measuring the layer formed without the transparent fine particles. If the refractive index is too small, the layer cannot prevent reflection well. On the other hand, if it is too high, the reflected light is unfavorably colored.

The transparent resin comprises a binder. The binder is preferably a polymer having a main chain of saturated hydrocarbon or polyether (more preferably, hydrocarbon), and the polymer is preferably crosslinked. The polymer having a main chain of saturated hydrocarbon is preferably prepared from ethylenically unsaturated monomers through polymerization reaction. The monomer preferably has two or more ethylenically unsaturated groups to form a crosslinked polymer.

Examples of the monomer having two or more ethylenically unsaturated polymerizable groups include esters of polyhydric alcohol and (meth)acrylic acid (e.g., ethylene glycol di(meth)acrylate, 1,4-dichlorohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, polyester polyacrylate), vinylbenzene and derivatives thereof (e.g., 1,4-divinylbenzene, 4-vinylbenzoic acid-2-acryloyl ethylester, 1,4-divinylcyclohexanone), vinylsulfones (e.g., divinylsulfone), acrylamides (e.g., methylene bisacrylamide) and methacrylamide. In consideration of hardness and scratching resistance of the film, (meth)acrylate having three or more functional groups is preferred, and acrylate having five or more functional groups is more preferred. A mixture of dipentaerythritol pentaacrylate and dipentaerythritol hexaacrylate is commercially available and particularly preferably used.

These monomers having ethylenically unsaturated polymerizable groups are dissolved in a solvent together with various polymerization initiators and additives. The thus-prepared solution (coating solution) is applied on a support, dried and polymerized to harden by ionization radiation or heat.

In place of or in addition to the monomers having two or more ethylenically unsaturated polymerizable groups, crosslinking groups may be introduced into the binder to be crosslinked. Examples of the crosslinking group include isocyanate group, epoxy group, aziridine group, oxazolidine group, aldehyde group, carbonyl group, hydrazine group, carboxyl group, methylol group, and active methylene group. Further, the crosslinked structure can be obtained by the monomers such as vinylsulfonic acid, acid anhydride, cyanoacrylate derivative, melamine, etherized methylol, ester, urethane, and methal alkoxide (e.g., tetramethoxysilane). Furthermore, the binder may be crosslinked by decomposition of some monomers such as block isocyanate group. As the crosslinking group, not only groups that immediately induce crosslinking reaction but also groups that are decomposed to cause the reaction can be used. The binder having the crosslinking group can be crosslinked by heating.

Besides the above binder polymer, the transparent resin comprises a copolymer of monomers having high refractive indexes and/or superfine particles of metal oxide having a high refractive index.

Examples of the monomers having high refractive indexes include bis(4-methacryloylthiophenyl)sulfide, vinylnaphthalene, vinylphenylsulfide, and 4-methacryloxyphenyl-4'-methoxyphenylthioether.

The metal oxide having a high refractive index is preferably an oxide of at least one metal selected from the group consisting of zirconium, titanium, aluminum, indium, zinc, tin and antimony. The size of the superfine particles is 100 nm or less, preferably 50 nm or less. The metal oxide is preferably an oxide of at least one metal selected from the group consisting of Zr, Zn, Ti, In and Sn. Examples of the metal oxide include $ZrO_2$, $TiO_2$, $Al_2O_3$, $In_2O_3$, ZnO, $SnO_2$, $Sb_2O_3$ and ITO. Among then, $ZrO_2$ is particularly preferred. The amount of the monomers having high refractive indexes or the superfine particles of metal oxide is in the range of 10 to 90 wt. %, preferably in the range of 20 to 80 wt. % based on the total weight of the transparent resin.

The scattering layer containing the transparent resin is provided on the transparent substrate. For forming the layer, a solution of the resin is applied on the film. As a solvent of the solution, at least one solvent dissolving material of the substrate (e.g., triacetyl cellulose) and at least one solvent not dissolving the material of the substrate are used in combination. That mixed solvent prevents the layer from glaring, and at the same time enhances the adhesion between the layer and the substrate. Preferably, at least one solvent not dissolving the substrate has a higher boiling point than at least one solvent dissolving the substrate. The highest boiling point of the solvents not dissolving the substrate is higher than the lowest boiling point of the solvents dissolving the substrate more preferably by 30° C. or more, most preferably by 50° C. or more.

Examples of the solvent dissolving the material of the substrate (preferably, triacetyl cellulose) include ethers having 3 to 12 carbon atoms (e.g., dibutyl ether, dimethoxy methane, dimethoxy ethane, diethoxy ethane, propylene oxide, 1,4-dioxane, 1,3-dioxolane, 1,3,5-trioxane, teterahydrofuran, anisole, phenetole), ketones having 3 to 12 carbon atoms (e.g., acetone, methyl ethyl ketone, diethyl ketone, dipropyl ketone, diisobutyl ketone, cyclopentanone, cyclohexanone, methyl cyclohexanone), esters having 3 to 12 carbon atoms (e.g., ethyl formate, propyl formate, n-pentyl formate, methyl acetate, ethyl acetate, methyl propionate, ethyl propionate, n-pentyl acetate, y-butyrolactone), organic solvents having two or more kinds of functional groups (e.g., methyl 2-methoxyacetate, methyl 2-ethoxyacetate, ethyl 2-ethoxyacetate, ethyl 2-ethoxypropionate, 2-methoxyehanol, 2-propoxyethanol, 2-butoxyethanol, 1,2-diacetoxyacetone, acetylacetone, diacetonealcohol, methyl acetoacetate, ethyl acetoacetate). These may be used singly or in combination. Ketones are preferred.

Examples of the solvent not dissolving the material of the substrate (preferably, triacetyl cellulose) include methanol, ethanol, 1-propanol, 2-propanol, 1-butanol, 2-butanol, tert-butanol, 1-pentanol, 2-methyl-2-butanol, cyclohexanol, isobutyl acetate, methyl isobutyl ketone, 2-octanone, 2-pentanone, 2-hexanone, 2-heptanone, 3-pentanone, 3-heptanone and 4-heptanone. These may be used singly or in combination.

The ratio (A/B) of the total amount of the solvents dissolving material of the substrate (A) per the total amount of the solvents not dissolving that material (B) is preferably in the range of 5/95 to 50/50, more preferably in the range of 10/90 to 40/60, most preferably in the range of 15/85 to 30/70.

The aforementioned composition of ionization radiation-setting resin can be hardened in the normal manner, namely, by irradiation of electron beams or ultraviolet rays.

In the irradiation of electron beams, various electron accelerators such as Cockcroft-Walton accelerator, Van de Graaff accelerator, resonant transforming accelerator, insulating core-transforming accelerator, linear accelerator, dinamitron, and radio-frequency accelerator can be used. The electron beams have energy in the range of 50 to 1,000 KeV, preferably in the range of 100 to 300 KeV. In the irradiation of ultraviolet rays, various light sources such as extra high pressure mercury lamp, high pressure mercury lamp, low pressure mercury lamp, carbon arc lamp, xenon arc lamp, and metal halide arc lamp can be used.

[Low Refractive Index Layer]

A low refractive index layer as an anti-reflection layer is provided on the top surface of the scattering layer side, to prevent the film from reflecting light coming from outside.

The low refractive index layer has a refractive index in the range of 1.35 to 1.45.

The refractive index of the low refractive index layer preferably satisfies the following formula (I):

$$(m\lambda/4) \times 0.7 < n_1 \times d_1 < (m\lambda/4) \times 1.3 \qquad \text{Formula (I)}$$

in which m is a positive odd number (usually 1), $n_1$ is the refractive index of the low refractive index layer, $d_1$ is the thickness (nm) of the low refractive index layer, and $\lambda$ is a wavelength of visible light in the region of 450 to 650 nm.

When the refractive index ($n_1$) satisfies the formula (I), a certain positive odd number (m) (which is usually 1) satisfying the formula (I) can be found in the above wavelength region.

The low refractive index layer can be made of a fluorine-containing resin prepared by hardening a thermosetting or ionization radiation-setting crosslinkable fluorine-containing compound. The thus-prepared layer has better scratch resistance than a low refractive index layer made of magnesium fluoride or calcium fluoride. The hardened fluorine-containing resin has a refractive index in the range of 1.35 to 1.45. The hardened fluorine-containing resin has a coefficient of kinetic friction preferably in the range of 0.03 to 0.15, and gives a contact angle with water preferably in the range of 90° to 120°.

Examples of the crosslinkable fluorine-containing compound include a perfluoroalkyl-containing silane compound (e.g., (heptadecafluoro-1,1,2,2-tetradecyl)triethoxysilane) and a fluorine-containing copolymer derived from fluorine-containing monomers and monomers introducing crosslinking groups.

Examples of the fluorine-containing monomers include fluoroolefins (e.g., fluoroethylene, vinylidene fluoride, tetrafluoroethylene, hexafluoroethylene, hexafluoropropylene, perfluoro-2,2-dimethyl-1,3-dioxole), partially or completely fluorinated (meth)acrylic alkyl ester derivatives (e.g., Biscoat 6FM [trade name, Osaka Organic Chemicals Co., Ltd.], M-2020 [trade name, Daikin Co., Ltd.], and partially or completely fluorinated vinyl ethers.

Examples of the monomers introducing crosslinking groups include a (meth)acrylate monomer having a crosslinking group (e.g., glycidyl methacrylate), and a (meth)acrylate monomer having carboxyl, hydroxyl, amino or sulfonic acid group (e.g., (meth)acrylic acid, methylol (meth)acrylate, hydroxyalkyl (meth)acrylate, allylic acrylate). After the (meth)acrylate monomers having carboxyl, hydroxyl, amino or sulfonic acid group are copolymerized, crosslinked structure can be formed in the manner described in Japanese Patent Provisional Publication Nos. 10(1998)-25388 and 10(1998)-147739.

As well as the copolymer derived from fluorine-containing monomers and monomers introducing crosslinking groups, a copolymer derived from these monomers and other monomers can be also used for the low refractive index layer.

The usable monomers other than the above monomers are not particularly restricted. Examples of them include olefins (e.g., ethylene, propylene, isoprene, vinyl chloride, vinylidene chloride), acrylate esters (e.g., methyl acrylate, ethyl acrylate, 2-ethylhexyl acrylate), methacrylate esters (e.g., methyl methacrylate, ethyl methacrylate, butyl methacrylate, ethylene glycol dimethacrylate), styrene derivatives (e.g., styrene, divinylbenzene, vinyltoluene, a-methylstyrene), vinyl ethers (e.g., methylvinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives.

In the fluorine-containing resin used in the low refractive index layer, superfine particles of Si oxide are preferably dispersed to make the layer tough against scratching. The mean size of the Si oxide particles is preferably 0.1 $\mu$m or less, more preferably in the range of 0.001 to 0.05 $\mu$m. The lower refractive index the fluorine-containing resin has, the more the layer is prevented from reflecting light. However, if the refractive index is too low, the scratching resistance is impaired. Accordingly, the refractive index of the resin and the amount of the Si oxide particles are controlled so adequately that the refractive index and the scratching resistance may be optimally balanced.

As the superfine particles of Si oxide, commercially available silica sol dispersed in an organic solvent can be directly added to a coating solution for forming the low refractive index layer. Otherwise, various commercially available silica powders may be dispersed in an organic solvent to prepare a silica dispersion to use.

When vertically peeled from a film of triacetyl cellulose (TAC) or polyethylene terephthalate (PET) at ordinary temperature and ordinary humidity, the anti-reflection film of the invention is electrified preferably in the range of −200 to +200 pc (pico coulomb)/cm$^2$, more preferably in the range of −100 to +100 pc/cm$^2$, further preferably in the range of −50 to +50 pc/cm$^2$. Most preferably, the film is not electrified. [The unit 1 pc means $10^{-12}$ coulomb.]

In detail, the film is electrified at ordinary temperature and 10%RH preferably in the range of −100 to +100 pc/cm$^2$, further preferably in the range of −50 to +50 pc/cm$^2$. Most preferably, the film is not electrified.

The above-described electrification degree (vertically-peeling electrified charge) is measured in the following manner.

The sample to be measured is beforehand left for 2 hours or more under the condition of temperature and humidity for measurement. The measuring apparatus comprises a stage on which the sample is mounted, a head which holds a testing film and which repeatedly compresses and peels the testing film onto and from the sample, respectively, and an electrometer which is provided on the head to measure electrified charge on the sample. The sample is mounted on the stage, and then a TAC or PET testing film is installed in the head. After the apparatus is discharged, the head is repeatedly compressed onto and parted from the sample. The electrified charges after the testing film is peeled at the first and the fifth are measured and averaged. The procedure is repeated with respect to three samples, and the obtained values are averaged to determine the vertically-peeling electrified charge.

It depends on the materials of the sample and the testing film whether the electrified charge is positive or negative. However, the absolute value of the electrified charge is important.

Generally, a sample electrified at low humidity shows a high absolute value of the electrified charge. In contrast, however, the anti-glaring anti-reflection film of the invention shows a low absolute value, even if electrified at low humidity.

The anti-reflection film of the invention shows a low absolute value of the electrified charge at ordinary temperature and ordinary humidity or 10%RH, and hence is excellent in dustproof.

The contents of various elements of the antireflection film surface are controlled so that the electrified charge may be in the above-described range.

The anti-reflection film has a surface resistance of $1\times10^{11}$ $\Omega$ per square or more, preferably $1\times10^{12}$ $\Omega$ per square or more. The surface resistance can be measured according to the disc electrode method regulated in JIS. In the method, the current value is measured 1 minute after the voltage is applied so as to determine the surface resistance (SR).

It should be noted that the present invention essentially differs from a method in which the surface resistance is made small (for example, $1\times10^{10}$ $\Omega$ per square or less) enough to improve dustproof (to prevent the film from catching dust). Since the surface resistance is too small to ensure the quality of displayed image, that method is not adopted in the invention. In the present invention, the absolute value of the vertically-peeling electrified charge is made so small that the surface resistance does not need to be small. Accordingly, the surface resistance in the invention can be set $1\times10^{11}$ $\Omega$ per square or more, and thereby the image quality is ensured.

The anti-reflection film reflects incident light of 450 to 650 nm coming at the incident angle of 50 in an average mirror reflectance of 2.5% or less. The average mirror reflectance is preferably 1.2% or less, more preferably 1.1% or less.

Further, the incident light of 450 to 650 nm coming at the incident angle of 5° is reflected preferably in an integrated reflectance of 2.5% or less. The average integrated reflectance is more preferably 2.3% or less.

The light coming at the incident angle of 5° and the mirror reflectance of that incident light are explained below.

The mirror reflectance of light coming at the incident angle of 5° is a ratio of the intensity of light reflected out at the angle of −5° to the normal per the intensity of incident light coming at the angle of +50° to the normal. The mirror reflectance indicates how much the surface reflects surrounding scenes. The anti-glare anti-reflection film shows a small mirror reflectance because it has a rough surface (which is provided for anti-glare performance) scattering the incident light to reduce the intensity of reflected light.

Therefore, the mirror reflectance indicates both anti-reflection character and anti-glare character.

On the other hand, the integrated reflectance of light coming at the incident angle of 5° is a ratio of the total intensity of light reflected out in all directions per the intensity of incident light coming at the angle of +50° to the normal. Since it is not reduced by scattered light, the integrated reflectance indicates only anti-reflection character.

In the invention, the mirror reflectance and the integrated reflectance of light in the wavelength region of 450 to 650 nm coming at the incident angle of 5° are both controlled at 2.5% or less to realize both satisfying anti-reflection character and sufficient anti-glare character.

If the anti-reflection film reflects light in the wavelength region of 450 to 650 nm coming at the incident angle of 5° in an average mirror reflectance of more than 2.5%, it mirrors surrounding scenes so much that a display equipped with the film gives an image of poor recognizability.

If the anti-reflection film reflects light in the wavelength region of 450 to 650 nm coming at the incident angle of 5° in an average integrated reflectance of more than 2.5%, a display equipped with the film gives an image of poor contrast. The displayed image is whitened with light scattered by the rough surface (which is provided for anti-glare performance), and accordingly the quality of the image is impaired.

The anti-reflection film of the invention is preferably designed so that the incident light coming at the incident angle of 50° from the CIE standard light source D65 may be reflected to give ortho-reflected light having chromaticity satisfying the conditions of $L^* \leq 10, 0 \leq a^* \leq 2,$ and $-5 \leq b^* \leq 2$ in which $L^*$, $a^*$ and $b^*$ are values in $L^*a^*b^*$ color space of CIE 1976. The reflected light having the above conditions shows neutral chromaticity.

The chromaticity of ortho-reflected light having been emitted from the CIE standard light source D65 and having entered at the incident angle of 5° can be evaluated in terms of the $L^*$, $a^*$ and $b^*$ values in $L^*a^*b^*$ color space of CIE 1976. The $L^*$, $a^*$ and $b^*$ values are calculated from the spectral reflection spectrum, which is obtained from the product (at each wavelength) of the measured mirror reflectance of light in the wavelength region of 380 to 780 nm coming at the incident angle of 50° and the intensity (in the spectral distribution) of original light emitted from the light source D65.

If the $L^*$ value is 10 or more, the film cannot fully prevent the display surface from reflecting incident light. If the $a^*$ value is more than 2, the reflected light is unnaturally colored in violet. On the other hand, if the $a^*$ value is less than 0, the reflected light is unnaturally colored greenly. If the $b^*$ value is less than −5, the reflected light is unnaturally colored in blue. On the other hand, if the $b^*$ value is more than 2, the reflected light is unnaturally colored in yellow.

The refractive index of the low refractive index layer and that of the binder material for the anti-glare layer are balanced optimally so that the anti-reflection film may have a low refractive index and may give reflected light having neutral chromaticity.

A known anti-reflection film comprising three or more optical thin layers formed by deposition or spattering can be made to give an average mirror reflectance of 0.3% or less, and accordingly its $L^*$ value can be reduced to 3 or less. However, in that case, the $a^*$ and $b^*$ values are 10 or more and less than −10, respectively. Accordingly, the known film gives unnaturally colored reflected light. In contrast, the anti-glare anti-reflection film of the invention is remarkably improved in avoiding the unnatural coloring of reflected light.

[Transparent Substrate]

The transparent substrate is made of transparent resin or transparent glass. Examples of the transparent resin include triacetyl cellulose (TAC) (refractive index: 1.48), polyethylene terephthalate (PET), diacetylene cellulose, acetatebutylate cellulose, poly(ether sulphone), polyacrylic resin, polyurethane resin, polyester, polycarbonate, polysulfone, polyether, poly(methyl pentene), poly(ether ketone), and (meth)acrylonitrile. The thickness of the substrate is normally in the range of 25 to 1,000 μm.

The transparent substrate is provided on the top (or bottom) surface of the polarizing plate, and hence is preferably made of cellulose acetate, which is generally used for a protective film of the polarizing plate.

The substrate of cellulose acetate has both enough transparency and enough smooth surfaces to be preferably used in the diffusing film of the invention.

In the invention, cellulose acetate having an acetic acid content of 59.0 to 61.5% is preferably used. The term "acetic acid content" means the amount of combined acetic acid per one unit weight of cellulose. The acetic acid content is determined according to ASTM: D-817-91 (tests of cellulose acetate).

The cellulose ester has a viscosity average polymerization degree (DP) of preferably 250 or more, more preferably 290 or more. Further, it is also preferred for the cellulose ester used in the invention to have a narrow molecular weight distribution of Mw/Mn (Mw and Mn are weight and number average molecular weights, respectively), which is determined by gel permeation chromatography. The value of Mw/Mn is preferably in the range of 1.0 to 1.7, more preferably in the range of 1.3 to 1.65, most preferably in the range of 1.4 to 1.6.

Generally, hydroxyl groups at 2-, 3- and 6-position of cellulose acylate are not equally substituted (namely, the substitution degree at each position is not equal to one third of the total substitution degree), and the substitution degree at 6-position is apt to be relatively small. In the cellulose acylate used in the invention, the substitution degree at 6-position is preferably larger than those at 2- and 3-positions.

The hydroxyl group at 6-position is substituted with acyl group in an amount of preferably 32% or more, more preferably 33% or more, most preferably 34% or more, based on the total substitution degree. Further, the substitution degree of the acyl group at 6-position is preferably 0.88 or more.

The hydroxyl group at 6-position may be substituted with acyl group other than acetyl. Examples of the other acyl group are acyl groups having 3 or more carbon atoms (e.g., propionyl, butyloyl, valeroyl, benzoyl, acryloyl). The substitution degree at each position can be measured by means of NMR. Cellulose acylates prepared according to the methods described in Japanese Patent Provisional Publication No. 11(1999)-5851 are usable for the invention.

[Preparation of Cellulose Acetate Film]

The cellulose acetate film is preferably prepared according to solvent cast method. In the solvent cast method, a solution (dope) in which cellulose acetate is dissolved in an organic solvent is used.

Examples of the organic solvent include an ether having 3 to 12 carbon atoms, a ketone having 3 to 12 carbon atoms, an ester having 3 to 12 carbon atoms, and a halogenated hydrocarbon having 1 to 6 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl. If the solvent is the compound having two or more functional groups, the number of carbon atoms is in any of the above ranges.

Examples of the ether having 3 to 12 carbon atoms include diisopropyl ether, dimethoxymethane, dimethoxyethane, 1,4-dioxane, 1,3-dioxolan, tetrahydrofuran, anisole and phenetole.

Examples of the ketone having 3 to 12 carbon atoms include acetone, methylethyl ketone, diethyl ketone, diisobutyl ketone, cyclohexanone and methylcyclohexane.

Examples of the ester having 3 to 12 carbon atoms include ethyl formate, propyl formate, pentyl formate, methyl acetate, ethyl acetate, and pentyl acetate.

Examples of the compound having two or more functional groups include 2-ethoxyethyl acetate, 2-methoxyethanol and 2-butoxyethanol.

The halogenated hydrocarbon. preferably has one or two carbon atoms, more preferably one carbon atom. The halogen is preferably chlorine. The hydrogen in the halogenated hydrocarbon is substituted with halogen in an amount of preferably 25 to 75 mol. %, more preferably 30 to 70 mol. %, further preferably 35 to 65 mol. %, most preferably 40 to 60 mol. %. A typical halogenated hydrocarbon is methylene chloride.

Two or more kinds of the solvents may be mixed to use in combination.

The cellulose acetate solution can be prepared in an ordinary manner. The term "ordinary manner" means that the preparation is carried out at a temperature of 0° C. or more (room temperature or elevated temperature). The cellulose acetate solution (dope) can be prepared through a common process by means of a common apparatus in the normal solvent cast method. In the normal process, a halogenated hydrocarbon (particularly, methylene chloride) is preferably used as the solvent. A non-chlorine-containing solvent is also usable as described in Japanese Technical Disclosure 2001–1745.

The amount of cellulose acetate in the solution is preferably in the range of 10 to 40 wt. %, more preferably in the range of 10 to 30 wt. %. To the organic (main) solvent, additives described after may be optionally added.

Cellulose acetate and the organic solvent are mixed and stirred at room temperature (0 to 40° C.) to prepare the solution. For preparing the concentrated solution, the preparation may be carried out at an elevated temperature under a high pressure. In that case, the cellulose acetate and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is normally in the range of 40° C. or more, preferably in the range of 60 to 200° C., more preferably in the range of 80 to 110° C.

Before placed in the vessel, the components of the solution may be beforehand mixed. They may be also added one by one into the vessel. The vessel must be equipped with a stirring means. Inactive gas such as nitrogen gas may be charged in the vessel to increase the inner pressure. Otherwise, the vessel may be heated to elevate the vapor pressure of the solvent so that the inner pressure may increase. After the vessel is sealed, each component may be added under an elevated pressure.

The vessel is preferably heated from outside. For example, a jacket heater is preferably used. Otherwise, liquid heated with a plate heater placed outside of the vessel may be made to flow through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is provided to scratch and renew liquid attached on the inside wall.

In the vessel, various meters such as pressure gauge and thermometer may be provided. The components are dissolved in the solvent in the vessel. The thus-prepared dope may be cooled and then taken out of the vessel, or may be taken out and then cooled with a heat exchanger.

The solution can be prepared according to the cooling dissolution method, which makes it possible to dissolve cellulose acetate in an organic solvent in which cellulose acetate cannot be dissolved by a conventional process. Further, according to that method, cellulose acetate can be rapidly and homogeneously dissolved in an organic solvent in which cellulose acetate can. be dissolved by a conventional process.

First in the process of cooling dissolution method, cellulose acetate is gradually added with stirring into an organic solvent at room temperature.

The amount of cellulose acetate in the mixture is preferably in the range of 10 to 40 wt. %, more preferably in the range of 10 to 30 wt. %. Various additives described after may be added in the mixture.

The prepared mixture is cooled to a temperature of −100 to −10° C., preferably −80 to −10° C., more preferably −50 to −20° C., most preferably −50 to −30° C. The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, cellulose acetate is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the cooling rate is 10,000° C. per second, a technical upper limit is 1,000° C. per second, and a practical upper limit is 100° C. per second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If cellulose acetate is not sufficiently dissolved, the cooling and warming procedures may be repeated. It can be judged by observation with the eyes whether cellulose acetate is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at about 33° C. Below that temperature, the solution is in the form of homogeneous gel. The solution, therefore, must be kept at a temperature above the pseudo-phase transition point, preferably at a temperature higher than the pseudo-phase transition point by about 10° C. The pseudo-phase transition point depends upon various conditions such as the organic solvent, the acetic acid content, the viscosity average polymerization degree and the concentration of cellulose acetate.

The cellulose acetate film is formed from the prepared cellulose acetate solution (dope) according to the solvent cast method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the casting method are described in U.S. Pat. Nos. 2,336,310, 2,367,603, 2,492,078, 2,492,977, 2,492,978, 2,607,704, 2,739,069, 2,739,070, British Patent Nos. 640,7–31, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-17844. That procedure can shorten the time taken to complete the steps of cooling to peeling. For performing the procedure, the cast dope must gel at the surface temperature of the drum or band.

From the prepared cellulose acylate solution (dope), a film comprising two or more layers can be formed. Also in that case, the film is preferably formed by the solvent cast method. The dope is cast on a drum or a band, and the solvent is evaporated to form a film. The solid content of the dope is preferably controlled in the range of 10 to 40%. The surface of the drum or band is preferably beforehand polished to be a mirror.

Two or more cellulose acylate solutions can be cooperatively cast to form two or more layers. For example, two or more outlets are arranged at intervals along the running direction of the support, and from each outlet each cellulose acylate solution is cast to form a layered film (Japanese Patent Provisional Publication Nos. 61(1986)-158414, 1(1989)-122419 and 11(1999)-198285). Otherwise, cellulose acylate solutions may be cast from two outlets to form a film (Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933). Further, a flow of high-viscous cellulose acylate solution may be enclosed with a flow of low-viscous one to form a layered flow, and the high- and low-viscous solutions in the layered flow may be simultaneously extruded to produce a film (Japanese Patent Provisional Publication No. 56(1981)-162617).

Further, Japanese Patent Publication No. 44(1969)-20235 discloses another film preparation. In the disclosed process, a cellulose acylate solution is cast on the support from one outlet to form a film. After peeled from the support, the formed film is turned over and again placed on the support. On the thus appearing surface (having been in contact with the support), another cellulose acylate solution is cast from another outlet to form a film.

The used cellulose acylate solutions may be the same or different from each other. The function of each cellulose acylate layer can be given by each corresponding solution extruded from each outlet.

Other functional layers (e.g., adhesive layer, dye layer, antistatic layer, anti-halation layer, UV absorbing layer, polarizing layer) can be simultaneously formed from the cellulose acylate solutions in the above manner.

In a conventional single layer preparation process, it is necessary to extrude a cellulose acylate solution having such high concentration and such high viscosity that the resultant film may have the aimed thickness. Accordingly, that cellulose acylate solution is often so unstable that solid contents are deposited to cause troubles and to impair the planeness. To avoid the problem, plural concentrated cellulose acylate solutions are simultaneously extruded from outlets onto the support. The thus-prepared thick film has excellent planeness. In addition, since the concentrated solutions are used, the film is so easily dried that the productivity (particularly, production speed) can be improved.

A plasticizer can be added into the cellulose acylate solution to enhance mechanical strength of the resultant film or to shorten the time for drying. The plasticizer is, for example, a phosphate ester or a carboxylate ester. Examples of the phosphate ester used as the plasticizer include triphenyl phosphate (TPP) and tricresyl phosphate (TCP). Typical examples of the carboxylate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE) and tributyl o-acetylcitrate (OACTB). Besides the above, butyl oleate, methylacetyl ricinolate, dibutyl sebacate and various trimellitic esters are also usable. The plasticizers of phosphate esters (DMP, DEP, DBP, DOP, DPP, DEHP) are preferred. Particularly preferred are DEP and DPP.

The content of the plasticizer is preferably in the range of 0.1 to 25 wt. %, more preferably in the range of 1 to 20 wt. %, most preferably in the range of 3 to 15 wt. % based on the amount of cellulose ester.

Further, a deterioration inhibitor (e.g., oxidation inhibitor, peroxide decomposer, radical inhibitor, metal inactivating agent, oxygen scavenger, amine) may be incorporated in the cellulose acetate film. The deterioration inhibitor is described in Japanese Patent Provisional Publication Nos. 3(1991)-199201, 5(1993)-1907073, 5(1993)-194789, 5(1993)-271471 and 6(1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If it is more than 1 wt. %, the inhibitor often oozes out (bleeds out) to appear on the surface of the film. Particularly preferred deterioration inhibitors are butylated hydroxytoluene (BHT) and tribenzylamine (TBA).

[Surface Treatment of Cellulose Acetate Film]

The cellulose acetate film is preferably subjected to surface treatment. Examples of the surface treatment include glow discharge treatment, corona discharge treatment, ultraviolet (UV) treatment, flame treatment, and acid or alkali treatment. Further, an undercoating layer is preferably provided as described in Japanese Patent Provisional Publication No. 7(1995)-333433.

For ensuring the planeness of the film, the above treatments are carried out preferably at a temperature not higher than Tg (not higher than 150° C.).

In the case where the film is used as a transparent protective film of the polarizing plate, the acid or alkali treatment is preferably carried out to saponify the surface of the cellulose acetate film. That treatment enhances the adhesion between the polarizing plate and the film. The surface energy is preferably not less than 55 mN/m, more preferably in the range of 60 to 75 mN/m.

The alkali saponification treatment is explained below.

That treatment comprises the steps of immersing. the film surface in an alkaline solution, neutralizing with an acidic solution, washing with water, and drying.

Examples of the alkaline solution include solutions of KOH and NaOH. The normality of hydroxyl ion is preferably in the range of 0.1 to 3.0 N, more preferably in the range of 0.5 to 2.0 N. The temperature of the solution is preferably in the range of room temperature to 90° C., more preferably in the range of 40 to 70° C.

From the viewpoint of productivity, the alkaline solution is preferably applied on the film surface in place of immersing, and washed away with water after saponification. As the solvent for the coating alkaline solution, alcohols (e.g., IPA, n-butanol, methanol, ethanol) are preferred in consideration of wettability. Further, a dissolving aid such as water, propylene glycol. or ethylene glycol is preferably added in the coating solution.

The surface energy can be measured by the contact angle method, the wet heating method or the adsorption method (these methods are described in 'The basic theory and application of wetting (written in Japanese)', published by Realize Co., Ltd, 1989). The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at the crossing point.

<Optically Anisotropic Layer Comprising Liquid Crystal Compound>

[Liquid Crystal Compound]

The liquid crystal compound used in the optically anisotropic layer may be either rod-like or discotic one. The compound may be a polymer liquid crystal or a monomer liquid crystal of low molecular weight. Further, a polymer in which liquid crystal molecules of low molecular weight are crosslinked and thereby which no longer behaves as liquid crystal is also usable. A discotic liquid crystal compound is most preferably used in the invention.

Preferred examples of the rod-like liquid crystal compound are described in Japanese Patent Publication No. 2000-304932. Examples of the discotic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp.2655, (1994). The above discotic compound generally has a structure in which the discotic structure unit is located at the center as a parent core and further straight chain groups such as alkyl, alkoxy and substituted benzoyl are radially substituted. The discotic compound generally has the properties of liquid crystal, and hence includes a compound generally called discotic liquid crystal. As the discotic liquid crystal compounds, any compound can be used so long as it has negative uniaxial property and orientation property. Substance derived from the discotic compound is not always the above-described compound. For example, the low molecular weight discotic liquid crystal compound having a thermo- or photo-reactive group is polymerized by heat or light to form a polymer that does not behave as liquid crystal. Such polymer can be also used in the invention. Preferred examples of the discotic liquid crystal compound are described in Japanese Patent Provisional Publication No. 8(1996)-50206.

The optically anisotropic layer is a birefringent layer containing a compound having one or more discotic structure units, and the discotic structure units preferably have planes inclined from a plane of the transparent support at an angle varying in the direction of depth of the optically anisotropic layer.

The above-described angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease,-and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously.

The optically anisotropic layer can be generally prepared by the steps of coating the orientation layer with a solution of the discotic compound and other compounds dissolved in a solvent, drying, heating to a temperature for forming a discotic nematic phase, and cooling with the oriented condition (discotic nematic phase) kept. Otherwise, the layer can be prepared by the steps of coating the orientation layer with a solution of the discotic compound and other compounds (e.g., polymerizable monomer, photo-polymerization initiator) dissolved in a solvent, drying, heating to a temperature for forming a discotic nematic phase, polymerizing the heated layer (e.g., by radiation of UV light) and cooling. The transition temperature from discotic nematic phase to solid phase (temperature for heating) is preferably in the range of 70 to 300° C., especially 70 to 170° C.

The inclined angle of the discotic unit on the support side can be generally controlled by selecting the discotic compound or materials of the orientation layer, or by selecting methods for the rubbing treatment. On the other hand, for controlling the inclined angle of the discotic unit on the surface side (air side), the discotic compound or other compounds (e.g., plasticizer, surface active agent, polymerizable monomer and polymer) used together with the discotic compound are properly selected. Further, the extent of variation of the inclined angle can be also controlled by the above selections.

Any compound can be employed as the plasticizer, the surface active agent and the polymerizable monomer, so long as it is compatible with the discotic compound and it gives variation of the inclined angle or dose not inhibit the discotic compound molecules from aligning. Preferred is a polymerizable monomer (e.g., a compound having a vinyl, vinyloxy, acryloyl or methacryloyl group). The compound is preferably used in the amount of 1 to 50 wt. % (especially 5 to 30 wt. %) based on the amount of the discotic compound. Preferred examples of the polymerizable monomer include a acrylate having plural functional groups. The number of the functional groups is preferably three or more, more preferably four or more, most preferably six. Preferred examples of the acrylate having six functional groups include dipentaerythritol hexaacrylate. Two or more kinds of monomers having different numbers of functional groups can be mixed to use in combination.

As the polymer, any polymer can be employed, so long as it is compatible with the discotic compound and it gives variation of the inclined angle. Cellulose esters are preferably used. Examples of the cellulose esters include cellulose acetate, cellulose acetatepropionate, hydroxypropylcellulose, and cellulose acetatebutylate. The polymer is generally used in an amount of 0.1 to 10 wt. % (preferably 0.1 to 8.0 wt. %, more preferably 0.1 to 5.0 wt. %) based on the amount of the discotic compound, so as not to inhibit the discotic compound from aligning.

The optical compensatory sheet in the invention comprises a cellulose acetate film, an orientation layer and a discotic liquid crystal layer, piled up in order. The orientation layer is preferably made of crosslinked polymer, and preferably subjected to rubbing treatment.

[Orientation Layer]

The orientation layer in the invention is made of crosslinked two polymers. At least one of the polymers may be crosslinked by itself or with a crosslinking agent. In other words, the polymers which originally have functional groups or to which functional groups are introduced are reacted with light, heat or pH variation to form the orientation layer; or otherwise linking groups are introduced by a reactive crosslinking agent into the polymers so that the polymers are crosslinked to form the orientation layer.

In a normal process, a coating liquid containing the polymer and, if needed, the crosslinking agent is applied on the transparent support, and then heated to induce the crosslinking reaction. However, as long as the resultant optical compensatory sheet has enough durability, the reaction may be caused at any stage from the step of coating the support with the coating liquid to the step of producing the resultant sheet. In consideration of orientation of the discotic compound (in the optically anisotropic layer) on the orientation layer, the crosslinking reaction is preferably caused sufficiently after the discotic compound is aligned. When the coating liquid containing the polymer and the crosslinking agent is applied and heated to dry on the support, the crosslinking reaction generally proceeds. (If the heating temperature is low, the reaction further proceeds when the discotic compound is heated to the temperature to form discotic nematic phase.) After the applied and dried layer is subjected to rubbing treatment to form an orientation layer, another coating liquid containing the discotic compound is applied and heated to the temperature to form discotic nematic phase. The heated liquid on the orientation layer is cooled to prepare the optically anisotropic layer.

Polymers crosslinkable either by themselves or with crosslinking agents can be used for forming the orientation layer in the invention. Some polymers are crosslinkable both by themselves and with crosslinking agents, and of course they are also usable. Examples of the polymers include polymethyl metacrylate, acrylic acid/methacrylic acid copolymer, styrene/maleinimide copolymer, polyvinyl alcohol and denatured polyvinyl alcohol, poly(N-methylolacrylamide), styrene/vinyltoluene copolymer, chlorosulfonated polyethylene, nitrocellulose, polyvinyl chloride, chlorinated poly-olefin, polyester, polyimide, vinyl acetate/vinyl chloride copolymer, ethylene/vinyl acetate copolymer, carboxymethylcellulose, polyethylene, polypropylene, polycarbonate, and organic substances such as silan coupling agents. Preferred examples are water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are more preferred, and polyvinyl alcohol and denatured polyvinyl alcohol are particularly preferred.

It is most preferred to use two kinds of polyvinyl alcohols or denatured polyvinyl alcohols having different polymerization degrees.

The saponification degree of the polyvinyl alcohol is in the range of 70 to 100%, preferably in the range of 80 to 100%, more preferably in the range of 85 to 95%. The polymerization degree is preferably in the range of 100 to 3,000. Examples of the denatured polyvinyl alcohol include polyvinyl alcohols denatured by copolymerization (introduced denaturing group: $COONa$, $Si(OX)_3$, $N(CH_3)_3 \cdot Cl$, $C_9H_{19}COO$, $SO_3Na$, $C_{12}H_{25}$, etc.), by chain transfer (introduced denaturing group: $COONa$, $SH$, $C_{12}H_{25}$, etc.) and by block polymerization (introduced denaturing group: $COOH$, $CONH_2$, $COOR$, $C_6H_5$, etc.). Non- or denatured polyvinyl alcohols having saponification degrees of 80 to 100% is preferred, and alkylthio-denatured polyvinyl alcohols having saponification degrees of 85 to 95% are particularly preferred. With respect to the denatured polyvinyl alcohols, Japanese Patent Provisional Publication No. 8(1996)-338913 describes in detail their syntheses, measurement of visible absorption spectra and a method for determining the introducing ratios.

Examples of the crosslinking agent include aldehydes (e.g., formaldehyde, glyoxal, glutaraldehyde), N-methylol compounds (e.g., dimethylol urea, methyloldimethylhydantoin), dioxane derivatives (e.g., 2,3-dihydroxydioxane), compounds that works when the carboxylic group is activated (e.g., carbenium, 2-naphthalenesulfonate, 1,1-bispyrrolidino-1-chloropyridinium, 1-morpholinocarbonyl-3-(sulfonatoaminomethyl), active vinyl compounds (e.g., 1,3,5-triacryloyl-hexahydro-s-triazine, bis-(vinylsulfone) methane, N,N'-methylenebis-[β-(vinylsulfonyl) propionamide], active halogen compounds (e.g., 2,4-dichloro-6-hydroxy-s-triazine), isooxazoles and dialdehyde starch. These are preferably used together with water-soluble polymers, particularly polyvinyl alcohol and denatured polyvinyl alcohols (including the above-described denatured polyvinyl alcohols). Two or more crosslinking agents may be used in combination. In consideration of productivity, reactive aldehydes are preferred. Particularly preferred is glutaraldehyde.

The more the crosslinking agent is added, the stronger moisture resistance the resultant layer has. However, if the agent is incorporated in an amount of 50 wt. % or more based on the amount of the polymer, the resultant orientation layer shows poor orienting effect. Accordingly, the amount of the crosslinking agent is in the range of preferably 0.1 to 20 wt. %, more preferably 0.5 to 15 wt. % based on the amount of the polymer. The amount of non-reacted crosslinking agent remaining in the orientation layer is preferably not more than 1.0 wt. %, more preferably not more than 0.5 wt. % based on the amount of the orientation layer. If the layer contains the non-reacted agent in an amount of more than 1.0 wt. %, the layer has poor durability. A liquid crystal display comprising such orientation layer often suffers troubles of reticulation if used for a long time or left under hot and humid condition.

The orientation layer can be formed by the steps of applying a coating liquid containing the above polymer and the crosslinking agent onto the transparent support, heating to dry (and to crosslink), and subjecting to rubbing treatment. As described above, the crosslinking reaction may be caused at any step after applying the coating liquid. In the case where a water-soluble polymer such as polyvinyl alcohol is used, the coating solution is preferably prepared from a mixed solvent of water and an organic solvent having defoaming character (e.g., methanol). The ratio of water/methanol is normally in the range of 0:100 to 99:1, preferably in the range of 0:100 to 91:9. Because of defoaming character of the organic solvent, defects on the orientation layer are remarkably decreased, and accordingly the optically anisotropic layer has an improved surface. As the coating method, known methods such as spin-coating, dip-coating, curtain-coating, extrusion-coating, bar-coating and E-type coating can be adopted. The E-type coating method is particularly preferred. The thickness of the layer is preferably in the range of 0.1 to 10 $\mu$m. The applied layer is dried at a temperature of 20 to 110° C. For ensuring sufficient crosslinking, the temperature is preferably in the range of 60 to 100° C., more preferably in the range of 80 to 100° C. The time for drying is in the range of 1 minute to 36 hours, preferably in the range of 5 minutes to 30 minutes. The pH is also preferably adjusted at an optimal value according to the used crosslinking agent. If glutaraldehyde is used as the crosslinking agent, the pH is preferably in the range of 4.5 to 5.5, more preferably at 5.0.

The orientation layer is provided on the transparent support or an undercoating layer. After the above-described polymer layer is crosslinked, the surface of the layer is subjected to rubbing treatment. The orientation layer determines the aligning direction of discotic liquid crystal compound provided thereon.

The rubbing treatment can be conducted in the manner adopted widely in aligning liquid crystal molecules of LCD. The surface of the layer is rubbed with paper, cloth (gauze, felt, nylon, polyester) or rubber along a certain direction, to give the aligning function. Generally, the layer is rubbed several times with cloth on which fibers having the same length and thickness are provided.

<Transparent Support on which Optically Anisotropic Layer Comprising Liquid Crystal Compound is Provided>

The material of the support is not restricted as long as it is made of highly transparent plastic resin. A preferred material is cellulose acetate, which is also used for a protective film of the polarizing plate. The transparent support may be optically uniaxial or biaxial.

The transparent support, on which the optically anisotropic layer is provided, optically plays an important role. Therefore, the retardation value Re of the support is preferably in the range of 0 to 200 nm. The Rth of the support is preferably in the range of 70 to 400 nm.

If the liquid crystal display comprises two optically anisotropic cellulose acetate films, the Rth value of each film is preferably in the range of 70 to 250 nm.

If the liquid crystal display comprises one optically anisotropic cellulose acetate film, the Rth value of the film is preferably in the range of 150 to 400 nm.

The cellulose acetate film preferably has a birefringent index [$\Delta$n: nx−ny] of 0.00 to 0.002. The birefringent index along the film thickness [(nx+ny)/2−nz] is preferably in the range of 0.001 to 0.04.

The retardation value Re is determined according to the formula: Re=(nx−ny)×d in which nx is a refractive index along the show axis in the film plane (the maximum refractive index in the film plane), and ny is a refractive index perpendicular to the show axis in the film plane.

The retardation value Rth is determined according to the formula: Rth={(nx+ny)/2−nx}×d in which nx is a refractive index along the show axis in the film plane (the maximum refractive index in the film plane), ny is a refractive index along the traveling axis in the film plane (the minimum refractive index in the film plane), nz is a refractive index along the depth of the film, and d is thickness of the film in terms of nm.

[Polarizing Plate]

The polarizing plate comprises two transparent protective films and a polarizing membrane provided between the films. The diffusing film or anti-reflection film of the invention can be used as one of the protective films. A normal cellulose acetate film can be used as the other protective film.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

The transparent substrate of the diffusing film and the cellulose acetate film are placed so that the slow axes of the films may be essentially parallel to the transmission axis of the polarizing membrane.

It has been found that the moisture-permeability of the protective film is important for production of the polarizing plate. In producing the polarizing plate, the polarizing membrane and the protective film are laminated with an aqueous adhesive, and then the solvent of the adhesive is diffused into the film to dry. The higher permeability the film has, the more-rapidly it is dried. Accordingly, the productivity of the polarizing plate is improved. However, if the permeability is too high, the outer moisture is liable to come into the membrane to impair polarizability if the liquid crystal display is used under humid condition.

The moisture-permeability depends upon various conditions such as thickness, free volume, and hydrophilicity (hydrophobicity) of the polymer film (and polymerizable liquid crystal compound).

The protective film in the polarizing plate has a moisture-permeability preferably in the range of 100 to 1,000 g/m$^2$·24 hours, more preferably in the range of 300 to 700 g/m$^2$·24 hours.

In the film forming process, conditions and procedures such as rip flow, line speed, stretching and/or compressing are adequately selected to control the thickness of the transparent substrate. Since the moisture-permeability depends on the materials, the thickness may be controlled so that the preferable permeability can be obtained.

Also in the film forming process, drying conditions such as time and temperature are suitably determined to control the free volume of the transparent substrate. Since the moisture-permeability depends on the materials, the free volume may be controlled so that the preferable permeability can be obtained.

The hydrophilicity (hydrophobicity) of the transparent substrate can be controlled with additives. If hydrophilic additives are contained in the above free volume, the permeability is increased. If hydrophobic additives are added, the permeability is decreased.

The moisture-permeability can be thus independently controlled, and thereby the polarizing plate having optical compensatory function can be produced at small cost with high productivity.

The polarizing plate preferably comprises the diffusing film or the anti-reflection film of the invention, a polarizer, and an optically anisotropic layer, piled up in order.

The optically anisotropic layer may be provided on a polymer film, and may contain a discotic liquid crystal compound or a rod-like liquid crystal compound. A discotic liquid crystal compound is preferred. In preparing the optically anisotropic layer, molecules of the discotic (or rod-like) liquid crystal compound are aligned and the thus-formed alignment is fixed.

Since the discotic liquid crystal molecules generally give large birefringence and have various alignment forms, an optically anisotropic layer prepared from the discotic liquid crystal molecules has a specific optical characteristic that cannot be obtained from the conventional stretched birefringent polymer film. The optically anisotropic layer comprising the discotic liquid crystal compound is described in Japanese Patent Provisional Publication No. 6(1996)-214116, U.S. Pat. Nos. 5,583,679 and 5,646,703, and West German Patent Publication No. 3911620A1.

[Liquid Crystal Display]

The diffusing film, the anti-reflection film or the polarizing plate of the invention is preferably used in a liquid crystal display. They are preferably placed on the top surface of the display.

A liquid crystal display of TN, MVA, OCB, ECB or CPA mode comprises two polarizing plates and a liquid crystal cell provided between them. The liquid crystal cell comprises a pair of electrode substrates and liquid crystal molecules placed between them.

One optically anisotropic layer is placed between the cell and one of the polarizing plates. Otherwise, two optically anisotropic layers are placed on both sides of the cell (i.e., each layer is placed between the cell and each polarizing plate).

The liquid crystal cell works preferably according to VA mode, OCB mode, TN mode, ECB mode or CPA mode.

In a liquid crystal cell of VA mode, rod-like liquid crystal molecules are essentially vertically aligned while voltage is not applied.

The liquid crystal cell of VA mode include some types:

(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied;

(4) a liquid crystal cell of SURVAIVAL mode (published in LCD international 98); and (5) a liquid crystal cell of CPA mode (published in SID01), in which the molecules are oriented in twisted alignment when voltage is applied.

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

In a liquid crystal cell of TN mode, rod-like liquid crystal molecules are essentially horizontally aligned while voltage is not applied, and oriented in twisted alignment with a twisted angle of 60 to 1200.

In a liquid crystal cell of ECB mode, rod-like liquid crystal molecules are essentially horizontally aligned while voltage is not applied.

The liquid crystal cells of TN mode and ECB mode are widely used in color TFT liquid crystal displays, and hence are described in many publications.

EXAMPLE 1

In a mixed solvent of methyl ethyl ketone/methyl isobutyl ketone (20/80, by weight), 100 weight parts of zirconium oxide-dispersed hard coat liquid (Desolite KZ-7114A, JSR Co., Ltd.), 43 weight parts of transparent resin (DPHA, Nippon Kayaku Co., Ltd.) and 5 weight parts of hardening initiator (Irgacure 184, Ciba-Geigy) were mixed and dissolved (dispersed) with stirring by means of air-disperser. The prepared liquid was applied, dried, and then exposed to ultraviolet light to harden the layer. The thus-formed layer had the refractive index of 1.64.

To the above prepared liquid, 8.5 weight parts of crosslinked polystyrene beads (SX350, Soken Kagaku Co., Ltd.; particles size: 3.5 $\mu$m; refractive index: 1.61) as the matting particles and 15 weight parts of gelatin as the scatterers were mixed and dispersed. The solid content of the mixture was controlled with methyl ethyl ketone/methyl isobutyl ketone (20/80, by weight) at 45%. The thus-prepared mixture was emulsified by means of a dissolver at 10,000 rpm for about 15 minutes. The prepared emulsion was applied on a triacetyl cellulose film (TD-80U, Fuji Photo Film Co., Ltd.) to form a layer having the dry thickness of 4.0 $\mu$m. The layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusing film (HKF-01) was prepared.

The haze value of the film HKF-01 was determined by means of a measuring apparatus (HR-100, Murakami Shikisai Gijutsu-kenkyujo Co., Ltd,) according to JIS-K-7105. As a result, it was found that the haze measured along the normal was 10% and that the haze measured in the direction inclined at 30° from the normal was 40%. Those values were suitable for the invention.

The film HKF-01 had the surface roughness of 0.15 µm, and the clearness of transmitted image was 55%.

The scatterers (transparent fine particles) had the average sizes of 15 µm and 3 µm in the sections parallel and perpendicular to the normal, respectively. Those having particle sizes of 0.1 to 50 µm had the average aspect ratio of 5 and the refractive index of 1.44.

For determining the aspect ratio of the scatterers, first the sizes in the section perpendicular to the normal were measured by means of a transmission optical microscope. The film was then cut with a microtome (CM1510, Leica), and the section was observed through an electron microscope (S3500N, Hitachi Science Systems Co., Ltd.) to measure the sizes in the section parallel to the normal.

EXAMPLE 2

As the transparent resin constituting the scattering layer, 150 weight parts of 65 wt. % zirconium oxide-dispersed gelatin was added in water. The obtained liquid was applied to form a layer having the refractive index of 1.64.

To the above liquid, 8.5 weight parts of crosslinked polystyrene beads (SX350, Soken Kagaku Co., Ltd.; particles size: 3.5 µm; refractive index: 1.61) as the matting particles and 20 weight parts of transparent monomer (a mixture of 43 weight parts of transparent resin [DPHA, Nippon Kayaku Co., Ltd.] and 5 weight parts of hardening initiator [Irgacure 184, Ciba-Geigy]) were mixed. The solid content of the prepared liquid was controlled with water at 50%. The thus-prepared liquid was emulsified by means of a dissolver at 10,000 rpm for about 15 minutes. The prepared emulsion was applied on a triacetyl cellulose film (TD-80U, Fuji Photo Film Co., Ltd.) to form a layer having the dry thickness of 3.5 µm. The layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusing film (HKF-02) was prepared. In the prepared film, the transparent monomer was polymerized with the hardening initiator to form fine particles that served as the scatterers.

The haze value of the film HKF-02 was determined by means of a measuring apparatus (HR-100, Murakami Shikisai Gijutsu-kenkyujo Co., Ltd,) according to JIS-K-7105. As a result, it was found that the haze measured along the normal was 7% and that the haze measured in the direction inclined at 30° from the normal was 54%. Those values were suitable for the invention.

The film HKF-02 had the surface roughness of 0.11 µm, and the clearness of transmitted image was 65%.

The scatterers (transparent fine particles) had the average sizes of 10 µm and 0.5 µm in the sections parallel and perpendicular to the normal, respectively. Those having particle sizes of 0.1 to 50 µm had the average aspect ratio of 20 and the refractive index of 1.51.

(Preparation of Coating Solution for Low Refractive Index Layer)

Into 93 g of a thermo-crosslinkable fluorine-containing polymer (JN-7228, JSR Co., Ltd.; refractive index: 1.42), 8 g of SiO$_2$ sol dispersed in methyl ethyl ketone (MEK-ST, Nissan Chemicals Co., Ltd.; solid content: 30 wt. %, average particle size of SiO$_2$:10 to 20 nm) and 100 g of methyl ethyl ketone were added and stirred. The obtained liquid was filtrated through a propylene filter (porous size: 1 µm) to prepare a coating solution for low refractive index layer.

EXAMPLE 3

The above-prepared coating solution was applied on the scattering layer of the diffusing film (HKF-01) by means of a wire-bar coater, dried at 80° C., and further heated at 120° C. for 10 minutes to crosslink. Thus, a low refractive index layer (thickness: 0.096 µm) was formed to produce an anti-reflection film (HKHB-01).

EXAMPLE 4

The coating solution for low refractive index layer was applied on the scattering layer of the diffusing film (HKF-02) by means of a wire-bar coater, dried at 80° C., and further heated at 120° C. for 10 minutes to crosslink. Thus, a low refractive index layer (thickness: 0.096 µm) was formed to produce an anti-reflection film (HKHB-02).

COMPARISON EXAMPLE 1

As the transparent resin constituting the scattering layer, 100 weight parts of UV curable resin (Desolite Z-7526, JSR Co., Ltd.; refractive index: 1.51) was used. To the resin, 12 weight parts of benzoguanamine-melamine-formaldehyde beads (Nippon Catalyst Co., Ltd.; particles size: 0.5 µm; refractive index: 1.68) as the transparent fine particles and 11 weight parts of crosslinked polystyrene beads (SX350H, Soken Kagaku Co., Ltd.; particles size: 3.5 µm; refractive index: 1.61) were mixed. The solid content of the prepared liquid was controlled with methyl ethyl ketone/acetone (40/60) at 50%. The thus-prepared liquid was applied on a triacetyl cellulose film (TD-80U, Fuji Photo Film Co., Ltd.) to form a layer having the dry thickness of 3.0 µm. The layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusing film was prepared.

The haze value of the prepared film was determined by means of a measuring apparatus (HR-100, Murakami Shikisai Gijutsu-kenkyujo Co., Ltd,) according to JIS-K-7105. As a result, it was found that the haze was 50%. The measured value was suitable for the invention. However, the film had the surface roughness Ra of 0.35 µm, and the clearness of transmitted image was 12%.

(Evaluation of Diffusing Film)

The prepared diffusing films were evaluated in the following manner.

(1) Mirror Reflectance

The mirror reflectance of light in the wavelength region of 380 to 780 nm coming at the incident angle of 5° was measured at the reflection angle of −5° by means of a spectrophotometer (V-550, Japan Spectrum Co., Ltd.) equipped with an adaptor ARV-474. The average reflectance in the wavelength range of 450 to 650 nm was calculated, and thereby the ability of anti-reflection was evaluated.

(2) Haze

The haze of each prepared film was measured with a haze meter (MODEL 1001DP, Nippon Denshoku kogyo Co., Ltd.).

(3) Hardness Evaluated with Pencil

The scratch resistance of each sample film was estimated in terms of hardness evaluated with a pencil according to JIS-K-5400. The anti-reflection film was left under the conditions of 25° C. and 60%RH for 2 hours, and then scratched with a testing pencil of 3H according to JIS-S-606

(loading weight: 1 kg). On the basis of the result, the sample was classified into the following three grades:

A: no scratch was observed,

B: one or two scratches were observed, and

C: three or more scratches were observed under the condition of n=5.

(4) Contact Angle

The resistance against stain (how hard the film catches finger prints) was estimated in terms of contact angle with water. Each sample was left under the conditions of 25° C. and 60%RH for 2 hours, and then the contact angle was measured.

(5) Coefficient of Kinetic Friction

The surface slipperiness was estimated in terms of coefficient of kinetic friction. Each sample was left under the conditions of 25° C. and 60%RH for 2 hours, and then its coefficient of kinetic friction was measured by means of a kinetic friction tester (HEIDON-14) with a 5 mmφ stainless steel ball (weight: 100 g, speed: 60 cm/minute).

(6) Anti-Glaringness

A fluorescent lamp (8,000 cd/m$^2$) was reflected in each prepared anti-glare film, and it was observed how blurred the reflected image was. On the basis of the observation, the sample was classified into the following four grades:

A: the outline of the image was completely blurred,

B: the outline of the image was slightly blurred,

C: the image was blurred, but the outline could be recognized, and

D: the image was blurred little.

(7) Surface Resistance

The surface resistance of each sample was measured according to the disc electrode method, and thereby it was confirmed that all samples had surface resistance of $1\times10^{12}$ Ω/cm or more.

(8) Electrification when Vertically Peeled

The electrification of each prepared film when vertically peeled from a triacetyl cellulose film was measured in the manner described above.

(9) Dustproof (How Hard to Catch Dust)

Each sample film was laminated on a glass plate, and discharged. After the film was rubbed with cloth (Tracy, Toray Industries, Inc.) 10 times, fine powder of Styrofoam (false dust) was sprinkled on the whole film. The film was then made to stand, and it was observed how much the false dust fell off. On the basis of the observation, the sample was classified into the following four grades:

A: almost all the false dust fell off,

B: 80% or more of the false dust fell off,

C: 50% or more of the false dust fell off, and

D: 50% or more of the false dust remained on the film.

The results are set forth in Table 1.

The results in Table 1 indicate that the diffusion films of Examples 3 and 4 were excellent in anti-glaringness and anti-reflection. Further, they had good film characters such as hardness evaluated with pencil (both had the grade A), contact angle (both showed large contact angles), and slipperiness (both had small coefficients of kinetic friction). They also gave weakly colored images. On the other hand, since the film of Comparison Example 1 had no low refractive index layer, it could not fully prevent reflection.

Polarizing plates equipped with the above films of Examples were prepared. Each polarizing plate was installed in a liquid crystal display, and evaluated.

<Preparation of Polarizing Plate on Observer Side SHB-01>

Iodine was adsorbed on a stretched polyvinyl alcohol film to prepare a polarizing membrane. The film HKHB-01 was saponified, and laminated on one surface of the polarizing membrane with polyvinyl adhesive so that the transparent substrate (triacetyl cellulose film) of the HKHB-01 might be contact with the membrane. A commercially available optical compensatory sheet [WVSA12B, Fuji Photo Film Co., Ltd.](which has an optically anisotropic layer comprising liquid crystal compound) was also saponified, and laminated on the other surface of the membrane with polyvinyl adhesive so that the support of the sheet might be contact with the membrane. Thus, a polarizing plate on observer side (SHB-01) was prepared.

<Preparation of Polarizing Plate on Observer Side SHB-02>

Iodine was adsorbed on a stretched polyvinyl alcohol film to prepare a polarizing membrane. The film HKHB-02 was saponified, and laminated on one surface of the polarizing membrane with polyvinyl adhesive so that the transparent substrate (triacetyl cellulose film) of the HKHB-02 might be contact with the membrane. A commercially available optical compensatory sheet [WVSA12B, Fuji Photo Film Co., Ltd.](which has an optically anisotropic layer comprising liquid crystal compound) was also saponified, and laminated on the other surface of the membrane with polyvinyl adhesive so that the support of the sheet might be contact with the membrane. Thus, a polarizing plate on observer side (SHB-02) was prepared.

<Preparation of Polarizing Plate on Backlight Side BHB-01>

Iodine was adsorbed on a stretched polyvinyl alcohol film to prepare a polarizing membrane. A commercially available triacetyl cellulose film (Fujitac TD80, Fuji Photo Film Co., Ltd.) was saponified, and laminated on one surface of the polarizing membrane with polyvinyl adhesive. A commercially available optical compensatory sheet [WVSA12B, Fuji Photo Film Co., Ltd.](which has an optically anisotropic layer comprising liquid crystal compound) was also saponified, and laminated on the other surface of the membrane with polyvinyl adhesive so that the cellulose acetate film might be contact with the membrane. Thus, a polarizing plate on backlight side (BHB-01) was prepared.

TABLE 1

| Diffusing film | Haze (%) Normal | Haze (%) 60° | Surface roughness (μm) | Electrification when vertically peeled (pc) | Dust proof grade | Mirror reflectance | Grade of anti-glare function | Coefficient of kinetic friction | Contact angle |
|---|---|---|---|---|---|---|---|---|---|
| Example 3 | 10 | 40 | 0.15 | +50 | A | 1.8% | A | 0.08 | 103° |
| Example 4 | 7 | 54 | 0.11 | −50 | A | 1.1% | A | 0.08 | 103° |
| Comp. Ex. 1 | 50 | 55 | 0.35 | −500 | D | 4.0% | A | — | — |

EXAMPLE 5

A pair of polarizing plates were removed from a commercially available liquid crystal display of TN mode (6E-A3, Sharp Corporation). In place of the removed polarizing plates, the polarizing plate (SHB-01) was laminated on the observer side surface with adhesive so that the optical compensatory sheet might be on the liquid crystal cell side. On the backlight side, the above-prepared polarizing plate on backlight side (BHB-01) was laminated with adhesive so that the optical compensatory sheet might be on the liquid crystal cell side. The polarizing plate on the observer side and that on the backlight side were placed so that the transmission axes of the observer side plate and the backlight side plate might be arranged in 0 mode. Thus, the liquid crystal display was prepared.

The viewing angle of the prepared liquid crystal display was measured by means of a measuring apparatus (EZ-Contrast 160D, ELDIM) when each of the eight tones of black (L1) to white (L8) was displayed. Further, the coloring of the image in a neutral tone (L3) was measured. The results are set forth in Table 2.

EXAMPLE 6

A pair of polarizing plates were removed from a commercially available liquid crystal display of TN mode (6E-A3, Sharp Corporation). In place of the removed polarizing plates, the polarizing plate (SHB-02) was laminated on the observer side surface with adhesive so that the optical compensatory sheet might be on the liquid crystal cell side. On the backlight side, the above-prepared polarizing plate on backlight side (BHB-01) was laminated with adhesive so that the optical compensatory sheet might be on the liquid crystal cell side. The polarizing plate on the observer side and that on the backlight side were placed so that the transmission axes of the observer side plate and the backlight side plate might be arranged in 0 mode. Thus, the liquid crystal. display was prepared.

The viewing angle of the prepared liquid crystal display was measured by means of a measuring apparatus (EZ-Contrast 160D, ELDIM) when each of the eight tones of black (L1) to white (L8) was displayed. Further, the coloring of the image in a neutral tone (L3) was measured. The results are set forth in Table 2.

COMPARISON EXAMPLE 1

A pair of polarizing plates were removed from a commercially available liquid crystal display of TN mode (6E-A3, Sharp Corporation). In place of the removed polarizing plates, commercially available polarizing plates (LL-82–12WNA, Sunritz Co., Ltd.) were laminated. The polarizing plate on the observer side and that on the backlight side were placed so that the transmission axes of the observer side plate and the backlight side plate might be arranged in 0 mode. Thus, the liquid crystal display was prepared.

The viewing angle of the prepared liquid crystal display was measured by means of a measuring apparatus (EZ-Contrast 160D, ELDIM) when each of the eight grade levels of black (L1) to white (L8) was displayed. Further, the coloring of the image in a neutral grade level (L3) was measured. The results are set forth in Table 2.

TABLE 2

| Liquid crystal display | Viewing angle giving a contrast ratio of 10 or more without reversing black grade levels | | |
|---|---|---|---|
| | Upward | Downward | Left-rightward |
| Example 5 | 80° | 75° | 160° |
| Example 6 | 75° | 65° | 160° |
| Comp. Ex. 2 | 30° | 15° | 100° |

Remark:
Black grade levels: grade levels between L1 and L2

The liquid crystal displays of Examples 5 and 6 gave images having the same qualities (brightness, contrast) as the image given by the display of Comparison Example 2, and this means that the displays of Examples 5 and 6 enlarged the viewing angles without impairing the image qualities. Thus, the anti-reflection film, the polarizing plate and the liquid crystal display according to the invention have excellent viewing angle characters.

EXAMPLE 7

In a mixed solvent of methyl ethyl ketone/methyl isobutyl ketone (20/80, by weight), 100 weight parts of silica-dispersed hard coat liquid (Desolite Z-7526, JSR Co., Ltd.), 43 weight parts of transparent resin (DPHA, Nippon Kayaku Co., Ltd.) and 5 weight parts of hardening initiator (Irgacure 184, Ciba-Geigy) were mixed and dispersed with stirring by means of air-disperser. The prepared liquid was applied, dried, and then exposed to ultraviolet light to harden the layer. The thus-formed layer had the refractive index of 1.51.

To the above liquid, 8.5 weight parts of crosslinked polystyrene beads (SX350, Soken Kagaku Co., Ltd.; particles size: 3.5 $\mu$m; refractive index: 1.61) as the matting particles and 15 weight parts of fine columnar stacks of barium ferrite (BF2700, Titanium Industries Co., Ltd.) as the scatterers were mixed. The solid content of the prepared liquid was controlled at 45%. The thus-prepared liquid was applied on a triacetyl cellulose film (TD-80U, Fuji Photo Film Co., Ltd.) to form a layer having the dry thickness of 4.0 $\mu$m. The layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusing film (HKF-03) was prepared. In the prepared film, the transparent monomer was polymerized with the hardening initiator to form fine particles that served as the scatterers.

The haze value of the film HKF-03 was determined by means of a measuring apparatus (HR-100, Murakami Shikisai Gijutsu-kenkyujo Co., Ltd,) according to JIS-K-7105. As a result, it was found that the haze measured along the normal was 9% and that the haze measured in the direction inclined at 30° from the normal was 60%. Those values were suitable for the invention.

The film HKF-03 had the surface roughness of 0.13 $\mu$m, and the clearness of transmitted image was 59%.

The scatterers (transparent fine particles) had the average sizes of 0.05 $\mu$m and 5 $\mu$m in the sections parallel and perpendicular to the normal, respectively. Those had the average aspect ratio of 0.01.

For determining the aspect ratio of the scatterers, first the sizes in the section perpendicular to the normal were measured by means of a transmission optical microscope. The film was then cut with a microtome (CM1510, Leica), and the section was observed through an electron microscope (S3500N, Hitachi Science Systems Co., Ltd.) to measure the sizes in the section parallel to the normal.

I claim:

1. A diffusing film comprising a transparent resin in which scatterers are dispersed, wherein the difference between the refractive index of the transparent resin and that of the scatterers is in the range of 0.04 to 1.5, wherein scatterers are tabular particles having particle sizes in the range of 0.1 to 50 μm, and wherein the ratio of the average size of scatterers in a section parallel to the film plane to that in a section perpendicular to the film plane is 2 or more.

2. The diffusing film of claim 1, wherein at least one surface of the diffusing film has a surface roughness of 0.05 to 0.18 μm.

3. The diffusing film of claim 1, wherein the transparent resin further contains a matting agent in the form of tine particles, and the difference between the refractive index of the transparent resin and that of the matting agent is less than 0.04.

4. The diffusing film of claim 1, wherein the transparent resin furthermore contains superfine particles whose particle sizes are less than 0.1 μm.

5. The diffusing film of claim 1, wherein a scattering layer comprising the transparent resin and the scatterers dispersed therein is provided on a transparent substrate.

6. The diffusing film of claim 5, wherein the scattering layer has a thickness of 2.0 to 6.0 μm.

7. The diffusing film of claim 5, wherein a low refractive index layer is further provided on the scattering layer.

8. The diffusing film of claim 7, wherein an incident ray coming into the low-refractive index layer at the incident angle of 5° is reflected in an average mirror reflectance of 2.5% or less in the wavelength region of 450 to 650 nm.

9. A diffusing film comprising a transparent resin in which scatterers are dispersed, wherein the difference between the refractive index of the transparent resin and that of the scatterers is in the range of 0.04 to 1.5, wherein scatterers are columnar or rod-like particles having particle sizes in the range of 0.1 to 50 μm, and wherein the ratio of the average size of scatterers in a section parallel to the film plane to that in a section perpendicular to the film plane is 0.5 or less.

10. The diffusing film of claim 9, wherein at least one surface of the diffusing film has a surface roughness of 0.05 to 0.18 μm.

11. The diffusing film of claim 9, wherein the transparent resin further contains a matting agent in the form of fine particles, and the difference between the refractive index of the transparent resin and that of the matting agent is less than 0.04.

12. The diffusing film of claim 9, wherein the transparent resin furthermore contains superfine particles whose particle sizes are less than 0.1 μm.

13. The diffusing film of claim 9, wherein a scattering layer comprising the transparent resin and the scatterers dispersed therein is provided on a transparent substrate.

14. The diffusing film of claim 13, wherein the scattering layer has a thickness of 2.0 to 6.0 μm.

15. The diffusing film of claim 13, wherein a low-refractive index layer is further provided on the scattering layer.

16. The diffusing film of claim 15, wherein an incident ray coming into the low-refractive index layer at the incident angle of 50° is reflected in an average mirror reflectance of 2.5% or less in the wavelength region of 450 to 650 nm.

17. A polarizing plate comprising a pair of protective films and a polarizing membrane provided between them, wherein one of the protective films is a diffusing film comprising a transparent resin in which scatterers are dispersed, wherein the difference between the refractive index of the transparent resin and that of the scatterers is in the range of 0.04 to 1.5, and wherein scatterers are tabular particles having particle sizes in the range of 0.1 to 50 μm and wherein the ratio of the average size of scatterers in a section parallel to the film plane to that in a section perpendicular to the film plane is 2 or more.

18. The polarizing plate of claim 17, wherein an optically anisotropic layer comprising a liquid crystal compound is provided on the other protective film.

19. The polarizing plate of claim 18, wherein the liquid crystal compound is a discotic compound.

20. A liquid crystal display of transmission type comprising a pair of polarizing plates and a liquid crystal cell provided between them, wherein the polarizing plate comprises a pair of protective films and a polarizing membrane provided between them, and the protective film on the screen side is a diffusing film comprising a transparent resin in which scatterers are dispersed, wherein the difference between the refractive index of the transparent resin and that of the scatterers is in the range of 0.04 to 1.5, and wherein scatterers are flat tabular particles having particle sizes in the range of 0.1 to 50 μm and wherein the ratio of the average size of scatterers in a section parallel to the film plane to that in a section perpendicular to the film plane is 2 or more.

21. A polarizing plate comprising a pair of protective films and a polarizing membrane provided between them, wherein one of the protective films is a diffusing film comprising a transparent resin in which scatterers are dispersed, wherein the difference between the refractive index of the transparent resin and that of the scatterers is in the range of 0.04 to 1.5, and wherein scatterers are columnar or rod-like particles having particle sizes in the range of 0.1 to 50 μm, and wherein the ratio of the average size of scatterers in a section parallel to the film plane to that in a section perpendicular to the film plane is 0.5 or less.

22. The polarizing plate of claim 21, wherein an optically anisotropic layer comprising a liquid crystal compound is provided on the other protective film.

23. The polarizing plate of claim 22, wherein the liquid crystal compound is a discotic compound.

24. A liquid crystal display of transmission type comprising a pair of polarizing plates and a liquid crystal cell provided between them, wherein the polarizing plate comprises a pair of protective films and a polarizing membrane provided between them, and the protective film on the screen side is a diffusing film comprising a transparent resin in which scatterers are dispersed, wherein the difference between the refractive index of the transparent resin and that of the scatterers is in the range of 0.04 to 1.5, and wherein scatterers are columnar or rod-like particles having particle sizes in the range of 0.1 to 50 μm, and wherein the ratio of the average size of the scatterers in a section parallel to the film plane to that in a section perpendicular to the film plane is 0.5 or less.

* * * * *